Jan. 7, 1958  G. W. KESTER  2,818,830
VIBRATION INDICATOR
Filed Nov. 27, 1953
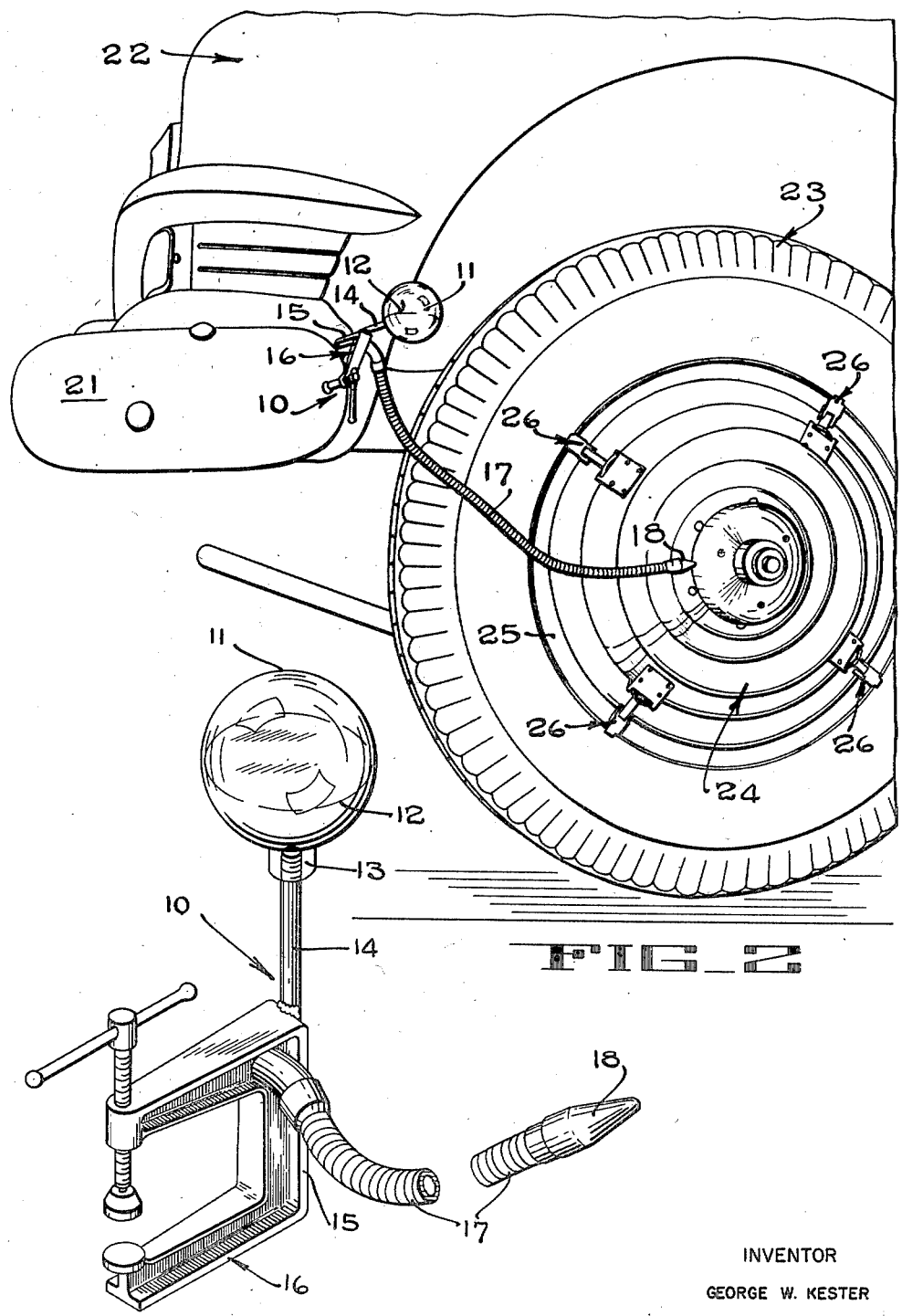
INVENTOR
GEORGE W. KESTER
BY Hans G. Hoffmeister
ATTORNEY

United States Patent Office 2,818,830
Patented Jan. 7, 1958

2,818,830
VIBRATION INDICATOR

George W. Kester, Lansing, Mich., assignor to Food Machinery and Chemical Corporation, San Jose, Calif., a corporation of Delaware Application November 27, 1953, Serial No. 394,760

4 Claims. (Cl. 116—114)

This invention pertains to devices for indicating vibration of objects.

One object of this invention is to provide an improved vibration indicator.

Another object is to provide a simple, inexpensive and sturdy vibration indicator.

These and other objects and advantages of the present invention will become apparent from the following description and the accompanying drawings, in which:

Fig. 1 is a perspective view of the vibration indicator of the present invention, certain parts being broken away.

Fig. 2 is a fragmentary perspective view of an automobile showing the present vibration indicator attached thereto.

The vibration indicator 10 (Fig. 1) of the present invention comprises a hollow transparent plastic sphere 11 partially filled with a low viscosity liquid 12, such as water or alcohol, which may be colored to make it easily visible. The sphere 11 has an apertured boss 13 formed integrally therewith which is adapted to threadedly engage the free end of an elongated support arm or rod 14 that is welded to the bight 15 of a C-clamp 16. The C-clamp 16 has a flexible, self-supporting tube 17 of common construction fastened thereto and extending laterally therefrom. The free end of the tube 17 is provided with a pointer 18.

An exemplary use of the indicator 10 is illustrated in Fig. 2 where the indicator is shown clamped in one operating position to the left end of the front bumper 21 of an automobile 22 for the purpose of indicating any vibrations which may be created in the bumper during an on-the-car balance test of the left front automobile wheel 23. In making such a test, the front end of the automobile 22 is jacked up until the wheel 23 is lifted from the ground, as shown in Fig. 2, and an on-the-car wheel balancer 24, such as that disclosed in the copending application of Helen Johnson Kellogg, administratrix of the estate of Bruce H. Kellogg, deceased, S. N. 394,786, filed November 27, 1953, now U. S. Patent No. 2,780,939 issued February 12, 1957, is fastened to the wheel rim 25 by means of four equally spaced clamps 26 which are adjustable to permit the centering of the balancer on the wheel. The centering of the balancer 24 is accomplished by positioning the flexible tube pointer 18 closely adjacent any desired axially extending surface of the balancer and slowly rotating the wheel 23, whereupon, by observing any variations in the distance between the pointer 18 and the chosen axially-extending surface of the balancer, any miscentering of the balancer on the wheel 23 will become evident. In case this test shows the balancer to be miscentered, this condition may be readily corrected by adjusting the clamps 26. The construction and operation of the wheel balancer 24 is fully explained in the above mentioned co-pending application, and, hence, further explanation thereof will not be included herein.

With the balancer 24 centered on the raised wheel 23, the wheel is rotated at a high speed by a wheel spinner (not shown) and if the wheel 23 is unbalanced the frame of the automobile and the bumper 21 attached thereto will vibrate. The vibrations of the bumper 21 will be transmitted through the C-clamp 16 and the elongated rod 14 to the sphere 11 and thence to the liquid 12, the surface of which will be visibly agitated, thus clearly indicating the unbalance of the wheel 23. The sensitivity of the indicator 10 is such that even if the unbalance of the wheel 23 is very slight the weak vibrations created thereby in the automobile will show up clearly on the surface of the liquid 12. With the wheel 23 still rotating at high speed the operator adjusts the balancer 24 until the agitation of the surface of the liquid 12 is at a minimum. The wheel 23 is then stopped, the balancer 24 is removed from the wheel 23, and appropriate balance weights are applied to the wheel at the position indicated by the balancer 24.

While I have described a preferred embodiment of the present invention, it will be understood that various changes and modifications may be made in the details thereof without departing from the spirit and scope of the appended claims.

Having thus described the invention what I claim as new and desire to protect by Letters Patent is:

1. A device for indicating vibrations of an object comprising a transparent envelope of predetermined shape, means mounting said envelope in any one of a plurality of operating positions on an object, and a quantity of liquid partly filling said envelope and providing a visible reference surface for detecting and indicating vibrations when said envelope is disposed in any one of said plurality of operating positions.

2. A device for indicating vibrations of an object comprising a transparent hollow spherical container for liquid, a liquid partly filling said container, and means mounting said container in any of a plurality of operating positions on an object, said liquid being arranged for self-adjusting movement along the inner surface of the wall of said hollow spherical container to assume a position providing a reference surface while said container is in any selected operating position.

3. A device for indicating vibrations of an object comprising a transparent spherical container for liquid, a support rod secured to said spherical container and disposed in alignment with a central axis of said container, means mounting said rod in any one of a plurality of operating positions on an object, and a quantity of liquid partly filling said container providing a reference surface for detecting and indicating vibrations set up in said object when said rod is disposed in any one of said plurality of operating positions.

4. A device for indicating vibrations of an object comprising a transparent envelope, a quantity of liquid partly filling said envelope, a support arm projecting from said envelope, and removable clamp means carried by said support arm remote from said envelope, said clamp means being arranged to mount said envelope on the object in any one of a plurality of operating positions in which vibrations are transmitted from the object to said liquid.

References Cited in the file of this patent

UNITED STATES PATENTS

| 1,498,419 | Balmer | June 17, 1924 |
| 1,662,356 | Ball | Mar. 13, 1928 |
| 2,510,198 | Tesmer | June 6, 1950 |
| 2,662,396 | Hunter | Dec. 15, 1953 |

FOREIGN PATENTS

| 23,580 | Great Britain | 1909 |